Aug. 28, 1945.  W. S. ADAMS  2,383,836
INTERNAL-COMBUSTION ENGINE
Filed June 21, 1944
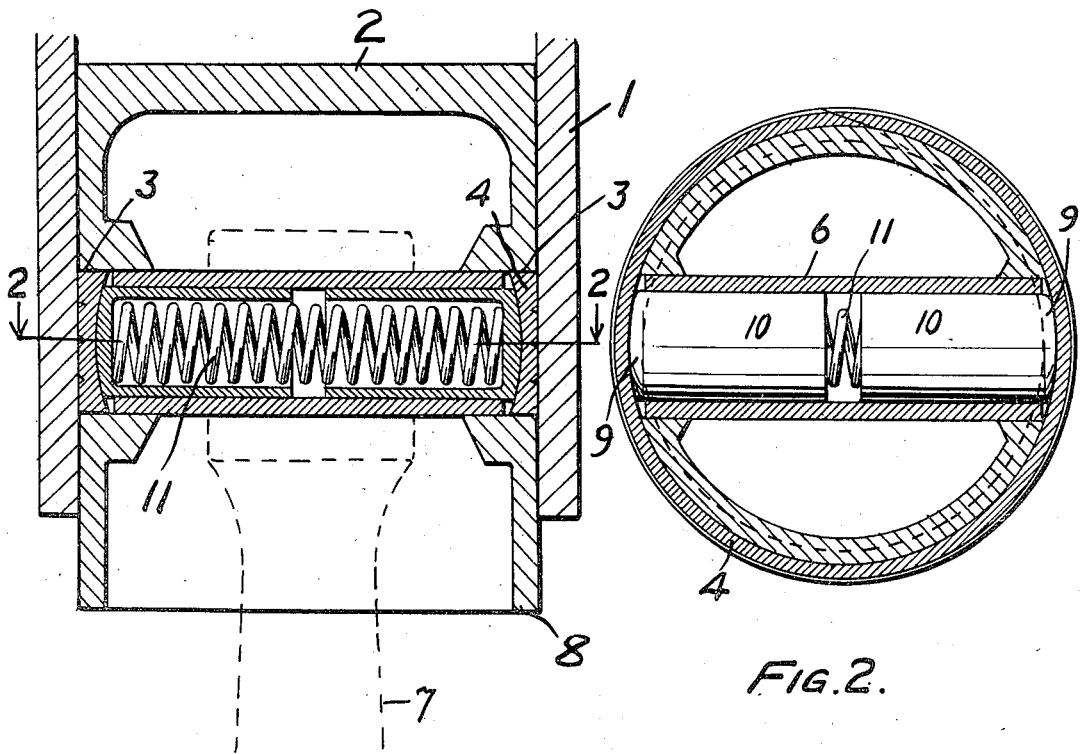
FIG. 1.
FIG. 2.
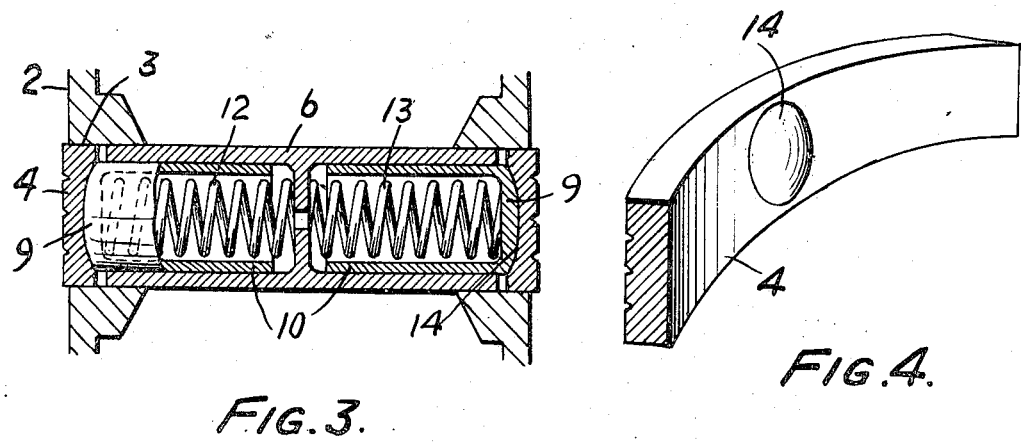
FIG. 3.
FIG. 4.
WITNESS:
Robt R Kitchel
INVENTOR
William Smiley Adams
BY
Augustus B Stoughton
ATTORNEY.

Patented Aug. 28, 1945

2,383,836

UNITED STATES PATENT OFFICE 2,383,836

INTERNAL-COMBUSTION ENGINE

William Smiley Adams, Haverford, Pa.

Application June 21, 1944, Serial No. 541,393

4 Claims. (Cl. 309—19)

The present invention relates to internal combustion engines, and more particularly to packing, guiding and lubricating the piston.

Objects of the present invention are: first, to increase the bearing area of the packing on the cylinder wall; second, to keep the piston centrally of the cylinder insuring even or equal distribution of oil around the skirt and in back of the piston opposing locking of packings on lands; third, to oppose working or movement of the piston inside of the packing; fourth, to reduce friction, ensure sledding motion and ease of operation; fifth, to oppose collapse of skirt and avoid undue wear on top of piston, such as is due to rocking and slapping of piston; sixth, to support the piston in line with the point of attachment of the connecting rod; seventh, to locate the point of direct rub opposite wrist pin in fast or heavy loaded pistons; and eighth, to confine breaking stress of pistons at source of stress set-up, thereby permitting packing to run normally.

Other objects of the invention will appear from the following description at the end of which the invention will be claimed.

In the following description reference will be made to the accompanying drawing forming part hereof and in which, Figure 1 is a central section of a portion of a piston and cylinder and illustrating features of the invention.

Figure 2 is a transverse sectional view taken on the line 2—2 of Figure 1.

Figure 3 is a detached transverse sectional view illustrating a modification; and Figure 4 is a perspective view of a part of a packing ring illustrating a modification of the invention.

Generally stated, the invention comprises a tubular crank pin open at each end through the piston wall, a piston ring and its complemental groove provided in the piston wall, and aligned with the open ends of the tubular crank pin, a pair of plungers having tubular skirts mounted in the hollow crank pin, with their heads in contact with the piston ring, and with their skirts in confronting relation, whereby oil under pressure, forced from the exterior of the piston between the exterior of the plunger and skirts and the inner wall of the crank pin, causes the plungers to exert pressure in the direction of the axis of the crank pin and on the piston ring.

The invention also comprises the improvements to be presently described and finally claimed.

Referring to the drawing, 1 indicates a portion of the cylinder and 2 indicates the piston of an internal combustion engine. The piston 2 is provided with a groove 3 in which is arranged a packing or piston ring 4. 6 is a tubular crank pin communicating through the wall of the piston with the periphery of the piston. 7 is the connecting rod, and 8 is the skirt of the piston. Within the hollow crank pin are arranged a pair of plungers 9 having tubular skirts 10, and having their heads in contact with the piston ring 4, and with their skirts in confronting relation, whereby oil under pressure forced from the exterior of the piston between the exterior of the plunger and skirts and the inner wall of the crank pin, causes the plungers to exert pressure in the direction of the axis of the crank pin and on the piston ring. 11 indicates a spring arranged within the skirts of the plungers, and acting upon their heads and tending to push the packing ring 4 into contact with the inner wall of the cylinder, in a direction aligned with the axis of the crank pin.

In the modification shown in Figure 3, two springs 12 and 13 in the crank pin are provided, also a perforated partition that serves as an abutment for the springs.

Referring to Figure 4 the piston ring 4, as employed in both forms of the invention shown in Figures 1 and 3, is provided with pits 14 arranged diametrically opposite each other, with their centers disposed at the axis of the crank pin. These pits accommodate the ends of the plungers 9, which are shown as somewhat convex.

By the described construction the objects or some of them herein before recited are accomplished, and the movement and operation of the piston improved.

I claim:

1. In an internal combustion engine, the combination with a piston and cylinder, of a tubular crank pin open at each end through the piston wall, said piston wall being provided with an external annular groove disposed in alinement with the open ends of the tubular crank pin, a piston ring fitted in said groove and covering the open ends of said crank pin, a pair of plungers having tubular skirts mounted in the hollow crank pin with their heads in contact with the piston ring and with their skirts in confronting relation, whereby oil or lubricant under pressure forced from the exterior of the piston between the exterior of the plunger and skirts and the inner wall of the crank pin, causes the plungers to exert pressure in the direction of the axis of the crank pin, and on the median portion of the piston ring.

2. In an internal combustion engine, the combination with a piston and cylinder, of a tubular crank pin open at each end through the piston wall, said piston wall being provided with an external annular groove disposed in alinement with the open ends of the tubular crank pin, a piston ring fitted in said groove and covering the open ends of said crank pin, a pair of plungers having tubular skirts mounted in the hollow crank pin with their heads in contact with the piston ring and with their skirts in confronting relation, whereby oil or lubricant under pressure forced from the exterior of the piston between the exterior of the plunger and skirts and the inner wall of the crank pin, causes the plungers to exert pressure in the direction of the axis of the crank pin and on the median portion of the piston ring, and a spring arranged within the skirts of the plungers, and abutting on the inner surface of the heads thereof.

3. In an internal combustion engine, the combination with a piston and cylinder, of a tubular crank pin open at each end through the piston wall, said piston wall being provided with an external annular groove disposed in alinement with the open ends of the tubular crank pin, a piston ring fitted in said groove and covering the open ends of said crank pin, a pair of plungers having tubular skirts mounted in the hollow crank pin with their heads in contact with the piston ring and with their skirts in confronting relation, whereby oil or lubricant under pressure forced from the exterior of the piston between the exterior of the plunger and skirts and the inner wall of the crank pin, causes the plungers to exert pressure in the direction of the axis of the crank pin and on the median portion of the piston ring, and an abutment arranged in and disposed centrally of the hollow crank pin, and a pair of springs interposed between the abutment and the heads of each of the plungers.

4. In an internal combustion engine, the combination with a piston and cylinder, of a tubular crank pin open at each end through the piston wall, said piston wall being provided with an external annular groove disposed in alinement with the open ends of the tubular crank pin, a piston ring fitted in said groove and covering the open ends of said crank pin, a pair of plungers having tubular skirts mounted in the hollow crank pin with their heads in contact with the piston ring and with their skirts in confronting relation, whereby oil or lubricant under pressure forced from the exterior of the piston between the exterior of the plunger and skirts and the inner wall of the crank pin causes the plungers to exert pressure in the direction of the axis of the crank pin and on the median portion of the piston ring, and the packing ring provided with diametrically disposed pits, arranged in line with the heads of the plungers.

WILLIAM SMILEY ADAMS.